United States Patent
Gahleitner et al.

(10) Patent No.: US 11,230,637 B2
(45) Date of Patent: Jan. 25, 2022

(54) SOFT POLYPROPYLENE COMPOSITION WITH IMPROVED PROPERTIES

(71) Applicant: BOREALIS AG, Vienna (AT)

(72) Inventors: Markus Gahleitner, Linz (AT); Jingbo Wang, Linz (AT); Friedrich Berger, Linz (AT)

(73) Assignee: BOREALIS AG, Vienna (AT)

( * ) Notice: Subject to any disclaimer, the term of this patent is extended or adjusted under 35 U.S.C. 154(b) by 280 days.

(21) Appl. No.: 16/496,191

(22) PCT Filed: Mar. 30, 2018

(86) PCT No.: PCT/EP2018/058282
§ 371 (c)(1),
(2) Date: Sep. 20, 2019

(87) PCT Pub. No.: WO2018/185024
PCT Pub. Date: Oct. 11, 2018

(65) Prior Publication Data
US 2020/0317898 A1    Oct. 8, 2020

(30) Foreign Application Priority Data

Apr. 4, 2017   (EP) .................................. 17164763

(51) Int. Cl.
C08L 23/14    (2006.01)

(52) U.S. Cl.
CPC ....... *C08L 23/142* (2013.01); *C08L 2205/025* (2013.01); *C08L 2205/03* (2013.01); *C08L 2207/02* (2013.01); *C08L 2207/04* (2013.01)

(58) Field of Classification Search
CPC ..... C08L 2207/02; C08L 23/16; C08L 23/142
See application file for complete search history.

(56) References Cited

U.S. PATENT DOCUMENTS

| | | | |
|---|---|---|---|
| 2015/0050442 A1* | 2/2015 | Gahleitner | C08J 5/18 428/36.92 |
| 2015/0086739 A1* | 3/2015 | Bernreitner | C08L 23/14 428/36.92 |
| 2016/0347944 A1 | 12/2016 | Wang et al. | |

FOREIGN PATENT DOCUMENTS

| | | |
|---|---|---|
| EP | 0887379 A1 | 12/1998 |
| EP | 0887380 A1 | 12/1998 |
| EP | 0887381 A1 | 12/1998 |
| EP | 0991684 B1 | 4/2000 |
| EP | 2610271 A1 | 7/2013 |
| EP | 2610272 A1 | 7/2013 |
| EP | 2610273 A1 | 7/2013 |
| EP | 2831169 B1 | 7/2019 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2012/007430 A1 | 1/2012 |
| WO | 2013/144061 A1 | 10/2013 |
| WO | 2013144060 A1 | 10/2013 |
| WO | 2015117948 A1 | 8/2015 |
| WO | 2017/001280 A1 | 1/2017 |
| WO | 2017005667 A1 | 1/2017 |

OTHER PUBLICATIONS

Zhou, et al., "A new decoupling method for accurate quantification of polyethylene copolymer composition and triad sequence distribution with 13C NMR", Journal of Magnetic Resonance 187, (2007), pp. 225-233.
Kakugo et al., "13C NMR Determination of Monomer Sequence Distribution in Ethylene-Propylene Copolymers Prepared with d-TiC13-Al(C2H5)2Cl" Macromolecules 1982, 15, pp. 1150-1152.
H.N.Cheng, "13C NMR Analysis of Ethylene-Propylene Rubbers", Macromolecules 1984, 17, 1950-1955.
Wang et al., "Structural Analysis of Ethylene/Propylene Copolymers Synthesized with a Constrained Geometry Catalyst", Macromolecules 2000, 33, pp. 1157-1162.
Zweifel, et al., "Plastics Additives Handbook", 5th Edition, Department of Materials, Institute of Polymers, 2001.
Singh et al., "Triad sequence determination of ethylene-propylene copolymers—application of quantitative 13C NMR", Polymer Testing 28 (2009) pp. 475-479.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.
Indian Office Action for Application No. 201917037263 dated Jun. 29, 2020.

\* cited by examiner

*Primary Examiner* — Mark S Kaucher
(74) *Attorney, Agent, or Firm* — Tarolli, Sundheim, Covell & Tummino LLP

(57) ABSTRACT

Soft polypropylene composition with improved optical and mechanical properties and especially improved resistance to steam sterilization, as well as to its manufacture and use and to articles made out of the new composition.

13 Claims, No Drawings

SOFT POLYPROPYLENE COMPOSITION WITH IMPROVED PROPERTIES

The present invention relates to a new soft polypropylene composition with improved optical and mechanical properties and especially improved resistance to steam sterilization, as well as to its manufacture and use and to articles made out of the new composition.

Polymers, like polypropylene, are increasingly used in different demanding applications. At the same time there is a continuous search for tailored polymers which meet the requirements of these applications.

For example heterophasic propylene copolymers (HECOs or RAHECOs) are already widely used in industry for various applications. Such HECOs or RAHECOs comprise a matrix being either a propylene homopolymer (HECOs) or a random propylene copolymer (RAHECOs) in which an elastomeric copolymer is dispersed (rubber phase). Thus the polypropylene matrix contains (finely) dispersed inclusions being not part of the matrix and said inclusions contain the elastomeric copolymer. The term "inclusion" according indicates that the matrix and the inclusion form different phases within the heterophasic system, said inclusions are for instance visible by high resolution microscopy, like electron microscopy or atomic force microscopy, or can be identified by dynamic mechanical thermal analysis (DMTA). Specifically in DMTA the presence of a multi-phase structure can be identified by the presence of at least two distinct glass transition temperatures.

Polyolefin compositions with high sterilization resistance and films comprising said compositions are gaining more and more interest, particularly in the field of packaging materials for medicals and food. The requirements for such films are high transparency, i.e. low haze, and high impact resistance. It is desirable that both properties are maintained after a step of heat sterilization which is, however, difficult to achieve for both properties together.

By "sterilization resistance", a minimization of both the loss of transparency and the impact resistance after heat sterilization is meant. A further requirement for modern packaging applications for medicals and food is a certain softness of the material, meaning that the modulus should be as low as possible. The currently existing solutions, like soft heterophasic propylene copolymers, are more or less suffering some challenges in one or the other respect. For example, due to the nature of the soft heterophasic propylene copolymers, the low temperature impact is poor because of the relatively high Tg of rubber phase (e.g. around −25° C. to −50° C.). This property consequently needs to be improved further. One way is to blend these materials with extra rubber materials, like styrene block copolymer or polyethylene plastomers, etc. Here, however, still the improvement is limited due to the factor that the compatibility issue between the external rubber and the matrix cannot be resolved easily.

Furthermore, the existing random heterophasic propylene copolymers applicable for film applications are prepared in the presence of catalysts comprising phthalic acid esters as internal donors. As in the medical area REACH compliance is of special importance, the application of health and environmentally harmful compounds such as phthalic acid esters should be avoided.

For some food packaging applications such as retort pouches or some medical packaging applications, a sterilization treatment is required. The most common sterilization procedures are the use of heat (steam), radiation (beta radiation, electrons, or gamma radiation) or chemicals (usually ethylene oxide). Steam sterilisation is usually carried out in a temperature range of 120° C. to 130° C.

Unfortunately it has turned out that the properties of standard heterophasic propylene copolymer systems change significantly after sterilization treatment. Typically, the optical properties such as haze as well as the mechanical properties such as softness are undesirable impaired.

EP 2831169 discloses a polymer composition, which comprise a heterophasic propylene copolymer and a styrenic based elastomer having rather low styrene content.

Such compositions show already some improved sterilization resistance in view of the Comparative Examples, but these RAHECOs are prepared with a Ziegler-Natta catalyst having a phthalate based internal donor.

US2016/347944 discloses soft and transparent impact polymers, which are heterophasic propylene copolymers (Rahecos). The Rahecos are used to prepare unoriented films as well as containers comprising the unoriented films. The invention aims for improving the balance between softness and haze. The Rahecos used for have a Flexural modulus in the range of 561 to 718 MPa.

Furthermore there is still the need to improve the sterilization resistance of soft heterophasic propylene copolymer compositions, i.e. there is still the need to provide soft heterophasic propylene copolymer compositions with high transparency, i.e. low haze, which is maintained after a step of heat sterilization.

Considering the drawbacks outlined above, it is an object of the present invention to provide a polymer composition which is soft, though and has good optical properties. Preferably these properties remain on a high level after sterilization treatment. A further object is that the properties of softness, toughness and good optical appearance are also observed at films made from the polymer composition before and after sterilization. Such compositions should in addition be free of phthalic acid esters or their decomposition products originating from a Ziegler-Nata catalyst.

The finding of the present invention is to provide a heterophasic propylene copolymer composition, comprising (A) a heterophasic propylene copolymer, wherein an elastomeric propylene copolymer (E) is dispersed in the matrix (M) of the heterophasic copolymer and (B) a styrene-based elastomer (B) with a rather low styrene content. Further, the finding of the present invention is that the heterophasic propylene copolymer (A) must be produced in the presence of a Ziegler-Natta catalyst containing an internal donor (D) not belonging to the class of phthalic acid ester derivatives. A random heterophasic propylene copolymer composition fulfilling the requirements as outlined above shows an improved balance between optical and mechanical properties before and after sterilization.

SUMMARY OF THE INVENTION

Thus the present invention is related to a soft heterophasic propylene copolymer composition, which comprises
(A) 50.0 to 99.0 wt % of a heterophasic polypropylene copolymer, said heterophasic propylene copolymer comprises
   (a-1) a matrix (M) being a crystalline polypropylene homo- or copolymer and
   (a-2) and elastomeric propylene copolymer (E) dispersed in said matrix (M)
   wherein the heterophasic polypropylene copolymer has
      (i) a melt flow rate (MFR 230° C./2.16 kg, ISO1133) of 0.5 to 20.0 g/10 min (ii) a xylene cold soluble (XCS) content determined according to ISO 16152 (25° C.) in the range of from 15.0 to 40.0 wt %

(iii) a total ethylene or $C_4$-$C_8$ comonomer content in the range of from 5.0 to 13.0 wt % and (iv) wherein the heterophasic polypropylene copolymer is free of phthalic acid esters or their decomposition products originating from a Ziegler-Natta catalyst and (B) 1.0 to 50.0 wt % of a styrene-based elastomer (B) being a saturated block copolymer of styrene with ethylene and butylene or propylene having a styrene content in the range of 5.0 to 22.0 wt % (measured with FTIR).

It has surprisingly been found out that such heterophasic propylene copolymer compositions have an optimized or improved balance between mechanical and optical properties, especially between softness, haze and resistance to steam sterilization, by which the optical properties are kept on a high level before and after sterilization.

In a further embodiment the present invention is related to a process for producing the heterophasic propylene copolymer composition, which process comprises the steps of (i) preparing the matrix (M), (ii) preparing the elastomeric propylene copolymer (E) and dispersing the elastomeric copolymer (E) in the matrix (M) to obtain the heterophasic propylene copolymer (A), whereby the heterophasic propylene copolymer is prepared in the presence of a) a Ziegler-Natta catalyst (ZN-C) comprising compounds (TC) of a transition metal of Group 4 to 6 of IUPAC, a Group 2 metal compound (MC) and an internal donor (ID), said internal donor (ID) is a non-phthalic compound, b) a co-catalyst (Co), and c) optionally an external donor (ED), and subsequently (iii) mixing said heterophasic propylene copolymer (A) with the styrene-based elastomer (B) and iv) extruding said mixture.

In an additional embodiment the present invention is related to the use of the heterophasic propylene copolymer composition for producing films and to the films as such, as well as to the containers comprising such films.

DETAILED DESCRIPTION

In the following the individual components are defined in more detail.

The soft heterophasic propylene copolymer composition according to the present invention comprises (A) 50.0 to 99.0 wt % of a heterophasic polypropylene copolymer and (B) 1.0 to 50.0 wt % of a styrene-based elastomer.

The terms "heterophasic polypropylene copolymer" and "base heterophasic polypropylene copolymer" used herein have the same meaning and are thus interchangeable. These terms stand for the copolymer (A) as such, i.e. without the styrene-based elastomer.

The term "soft heterophasic propylene copolymer composition" used herein means the blend of the heterophasic propylene copolymer (A) and the styrene-base elastomer (B).

Component (A): Heterophasic Polypropylene Copolymer

The heterophasic polypropylene copolymer comprises at least (a-1) a matrix (M) being a crystalline polypropylene homo- or copolymer and (a-2) and elastomeric propylene copolymer (E) dispersed in said matrix (M).

The term "heterophasic polypropylene copolymer" used herein denotes copolymers consisting of a matrix resin, being a crystalline polypropylene homo- or copolymer and an elastomeric, i.e. predominantly amorphous propylene copolymer (E) dispersed in said matrix resin, as defined in more detail below. Optionally the heterophasic polypropylene copolymer further comprises component (a3) being a crystalline copolymer fraction of ethylene with propylene or with a $CH_2=CHR$ alpha-olefin, and/or (a4) a nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The crystalline propylene polymer is present in such an amount that it forms a continuous phase which can act as a matrix.

The term "crystalline" in regard to the matrix polymer of a heterophasic copolymer is within the common knowledge of an art skilled person. In the present invention the term "crystalline" is therefore to be interpreted in its commonly accepted meaning, i.e. it means a crystallinity of the polymer in the range of from 30.0 to 70.0%, preferably 40.0 to 65.0% and more preferably 40.0 to 60.0% (measured with DSC).

Furthermore the terms "elastomeric propylene copolymer", "dispersed phase" and "rubber phase" denote the same, i.e. are interchangeable.

Ad Component (a-1):

Component (a-1) of the particular heterophasic polypropylene copolymer is a crystalline isotactic propylene homo- or copolymer forming the matrix of the heterophasic polypropylene copolymer.

The expression homopolymer used in the instant invention relates to a polypropylene that consists substantially, i.e. of at least 97.0 wt %, preferably of at least 98.0 wt %, more preferably of at least 99.0 wt %, still more preferably of at least 99.8 wt % of propylene units. In a preferred embodiment only propylene units in the propylene homopolymer are detectable.

The propylene homopolymer matrix is isotactic having a high pentad concentration, i.e. higher than 96.0 mol %, like a pentad concentration of at least 96.3 mol %. The pentad concentration is preferably 96.5 mol % up to 99.9% and more preferably 96.7 mol % to 99.8%.

The matrix can also be a propylene copolymer, i.e. a random propylene copolymer.

The random propylene copolymer comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the random propylene copolymer comprises, especially consists of, monomers copolymerizable with propylene from the group consisting of ethylene, 1-butene and 1-hexene. More specifically the random propylene copolymer comprises—apart from propylene—units derivable from ethylene and/or 1-butene. In a preferred embodiment the random propylene copolymer comprises units derivable from ethylene and propylene only.

The random propylene copolymer is featured by a moderate comonomer content. Accordingly, the comonomer content of the random propylene copolymer is in the range of 1.0 to 12.0 wt %, preferably in the range of 2.0 to 10.0 wt %, more preferably in the range of 3.0 to 8.0 wt % and even more preferably in the range of 3.0 to 6.0 wt %.

The propylene homo- or copolymer matrix has a melt flow rate MFR2 (ISO 1133; 230° C.; 2.16 kg) in the range of 0.5 to 20.0 g/10 min, preferably in the range of 1.0 to 15.0 g/10 min, more preferably in the range of 2.0 to 10.0 g/10 min and even more preferably in the range of 3.0 to 8.0 wt %.

The $MFR_2$ of the matrix is named matrix melt flow rate ($MFR_M$).

Moreover it is preferred that the amount of xylene solubles of propylene homo- or copolymer matrix is not too high. Xylene solubles are the part of the polymer soluble in cold xylene determined by dissolution in boiling xylene and letting the insoluble part crystallize from the cooling solution (determined at 25° C. according to ISO 16152). The xylene solubles fraction contains polymer chains of low stereo-regularity and is an indication for the amount of non-crystalline areas. Accordingly it is preferred that the xylene solubles fraction of the propylene homo- or copolymer matrix is in the range of 1.0 wt % to 10.0 wt %, more preferably in the range of 3.0 wt % to 10.0 wt %. In an even more preferred embodiment the xylene solubles fraction of the matrix is in the range of 5.0 wt % to 10.0 wt %.

The propylene homo- or copolymer matrix can be unimodal or multimodal, like bimodal.

When the propylene homo- or copolymer matrix phase is unimodal with respect to the molecular weight distribution, it may be prepared in a single stage process e.g. a slurry or gas phase process in a slurry or gas phase reactor. Preferably, a unimodal matrix phase is polymerized as a slurry polymerization. Alternatively, the unimodal matrix may be produced in a multistage process using at each stage process conditions which result in similar polymer properties.

Concerning the definition of unimodal and multimodal, like bimodal, it is referred to the definition below.

Where the propylene homo- or copolymer matrix comprises two or more different propylene polymers these may be polymers with different monomer make up and/or with different molecular weight distributions and/or $MFR_2$. These components may have identical or differing monomer compositions and tacticities.

Thus in one embodiment or the present invention the matrix is unimodal, whereas in another embodiment the matrix (M) is bimodal and consists of two propylene homopolymer fractions, two propylene copolymers fractions or one homo and one copolymer fraction.

In one preferred embodiment the matrix of component (A) is a random propylene copolymer (R-PP). Even more preferably the matrix of component (A) is a random propylene-ethylene copolymer.

Ad Component (a-2):

Component (a-2) of the particular heterophasic polypropylene copolymer is the elastomeric propylene copolymer (E), which is a predominantly amorphous copolymer (ii) of propylene and comonomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene.

Thus, component (a-2) is an elastomeric propylene copolymer (E), being dispersed in said matrix (M) (i.e. dispersed phase).

Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only. It is especially preferred that the random propylene copolymer (R-PP) and the elastomeric propylene copolymer (E) comprises the same comonomers. Accordingly in one specific embodiment the matrix random propylene copolymer (R-PP) and the elastomeric propylene copolymer (E) comprise propylene and ethylene only.

The elastomeric copolymer has an comonomer content, preferably ethylene content, in the range of 15.0 to 40.0 wt %, preferably in the range of 20.0 to 35.0 wt %, more preferably in the range of 25.0 to 35.0 wt % and even more preferably 28.0 to 35.0 wt %.

As stated above, the terms "elastomeric copolymer", "dispersed phase" and "rubber phase" denote the same, i.e. are interchangeable.

Like the propylene homo- or copolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution. Concerning the definition of unimodal and multimodal, like bimodal, it is referred to the definition above.

Preferably the unimodal dispersed phase is made in one reaction stage, more preferably in a gas phase reactor ad comprises, respectively consists of one propylene copolymer fractions (EPC1).

In another embodiment the dispersed phase comprises, preferably consists of two fractions, e.g. one ethylene copolymer fractions (EC1) and a second ethylene copolymer fraction (EC2).

These two fractions are preferably in-situ blended. The fractions (EC1) and (EC2) are preferably obtainable as described later.

In this case the two fractions (EPC1) and (EPC2) differ in view of the intrinsic viscosity and/or the comonomer distribution.

Ad Component (a-3)

As component (a-3) a crystalline ethylene copolymer fraction of ethylene with an α-olefin with 3-10 carbon atoms is optionally present, said fraction being insoluble in xylene at ambient temperature.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene copolymer. Such crystalline ethylene copolymer is present as inclusion in the amorphous phase due to thermodynamic reasons.

The crystalline ethylene copolymer has a melting temperature Tm2 and a melting enthalpy Hm2 as determined by DSC analysis according to ISO 11357.

Preferably, Tm2 of the crystalline ethylene copolymer is within the range of 105° C. to 130° C., more preferably within the range of 110° C. to 127° C. and most preferably within the range of 112° C. to 124° C.

Preferably, Hm2 of the crystalline ethylene copolymer is less than 4.0 J/g, more preferably less than 2.0 J/g and most preferably less than 1.0 J/g.

The crystalline ethylene copolymer is present in an amount from 0.0 to 5.0 wt %

Ad Component (a-4)

As optional component (a-4) a nucleating agent (NA) for promoting the α-phase of isotactic polypropylene can be present, i.e. an α-nucleating agent.

The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and C1-C8-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and (iv) polymeric nucleating agent, and (v) mixtures thereof.

Such additives are generally commercially available and are described, for example, in "Plastic Additives Handbook", 5th edition, 2001 of Hans Zweifel.

Preferably the α-nucleating agent is a polymeric nucleating agent, more preferably a vinylcycloalkane polymer and/or a vinylalkane polymer.

Said polymeric nucleating agent may be introduced into the heterophasic copolymer by blending with a masterbatch (MB) together with e.g. a carrier polymer or during polymerization of the heterophasic propylene copolymer, preferably, the polymeric nucleating agent is introduced into the composition by prepolymerizing the catalyst used to prepare a part or all of the heterophasic propylene copolymer.

Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

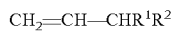

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

In case the nucleating agent is incorporated to the heterophasic polypropylene copolymer in the form of a masterbatch (MB) said polymeric nucleating agent, which is preferably alpha-nucleating agent, most preferably a vinylcycloalkane, like vinylcyclohexane (VCH), polymer and/or vinylalkane polymer, preferably vinylcyclohexane (VCH), as defined above or below, is preferably present in an amount of not more than 500 ppm, more preferably of 1 to 200 ppm, and still more preferably of 5 to 100 ppm, based on the weight of the master batch (100 wt %). In this embodiment, more preferably, said masterbatch (MB) is present in an amount of not more than 10.0 wt %, more preferably not more than 5.0 wt % and most preferably not more than 3.5 wt %, with the preferred amount of masterbatch (MB) being from 1.5 to 3.5 wt %, based on the total amount of the heterophasic propylene copolymer. Most preferably the masterbatch (MB) comprises, preferably consists of a homopolymer or copolymer, preferably homopolymer, of propylene which has been nucleated according to BNT-technology as described below.

It is preferred that the nucleating agent is introduced to the heterophasic polypropylene copolymer during the polymerization process of the heterophasic propylene copolymer. The nucleating agent is preferably introduced to the heterophasic propylene copolymer by first polymerizing the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the heterophasic propylene copolymer. The above incorporation of the polymeric nucleating agent to the heterophasic propylene copolymer during the polymerization of said heterophasic propylene copolymer is called herein as BNT-technology as described below.

Said obtained reaction mixture is herein below referred interchangeably as modified catalyst system.

Preferably the polymeric nucleating agent is vinylcyclohexane (VCH) polymer which is introduced into the heterophasic propylene copolymer by the BNT technology.

More preferably in this preferred embodiment, the amount of polymeric nucleating agent, like vinylcyclohexane (VCH), polymer and/or vinylalkane polymer, more preferably of vinylcyclohexane (VCH) polymer, in the heterophasic propylene copolymer is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the Ziegler-Natta procatalyst, an external donor and a cocatalyst, which vinyl compound has the formula: CH2=CH—CHR1R2 as defined above.

The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

When a α-nucleating agent is introduced to the heterophasic propylene copolymer during the polymerization process, the amount of nucleating agent present in the heterophasic propylene copolymer is preferably not more than 500 ppm, more preferably is 0.025 to 200 ppm, still more preferably is 1 to 100 ppm, and most preferably is 5 to 100 ppm, based on the heterophasic propylene copolymer and the nucleating agent, preferably based on the total weight of the heterophasic propylene copolymer including all additives.

Properties of Component (A), the Heterophasic Polypropylene Copolymer

The heterophasic polypropylene copolymer of the present inventions is further characterized by a total melt flow rate (MFR$_T$) (ISO 1133; 230° C.; 2.16 kg) in the range of 0.5 to 20.0 g/10 min, preferably in the range of 1.0 to 15.0 g/10 min, more preferably in the range of 2.0 to 10.0 g/10 min, even more preferably in the range of 3.0 to 7.0 g/10 min and most preferably in the range of 3.5 to 6.5 g/10 min.

Preferably the final melt flow rate of the heterophasic propylene copolymer is adjusted during the polymerization process. Accordingly the reactor-made heterophasic propylene copolymer has the melt flow rate as defined above or in the claims. "Reactor-made heterophasic propylene copolymer" denotes herein that the melt flow rate of the heterophasic propylene copolymer has not been modified on purpose by post-treatment. Accordingly, in a preferred embodiment the heterophasic propylene copolymer is non-visbroken, particularly not visbroken using peroxide. Accordingly, the melt flow rate is not increased by shortening the chain length of the heterophasic propylene copolymer according to this invention by use of peroxide. Thus it is preferred that the heterophasic propylene copolymer does not contain any peroxide and/or decomposition product thereof.

It is also appreciated that the total content of the ethylene comonomers in the total heterophasic propylene copolymer is rather moderate.

Accordingly it is preferred that the heterophasic propylene copolymer has a total ethylene comonomer content in the range of 5.0 to 13.0 wt %, preferably in the range of 6.0 to 12.0 wt % and more preferably in the range of 7.0 to 10.0 wt %.

The amount of the xylene cold soluble (XCS) fraction of the heterophasic propylene copolymer is in the range of 15.0 to 30.0 wt % in view of the base heterophasic propylene copolymer, preferably in the range of 18.0 to 30.0 wt % and more preferably in the range of 18.0 to 25.0 wt %.

The intrinsic viscosity (IV) measured according to ISO 1628-1 (at 135° C. in decaline) of the XCS fraction of the heterophasic propylene copolymer is in the range of more than 1.0 to 2.0 dl/g, preferably in the range of 1.1 to 1.8 dl/g and more preferably in the range of 1.2 to 1.6 dl/g.

In addition the heterophasic propylene copolymer (A) has a melting temperature below 148° C. Preferably the melting temperature of the heterophasic propylene copolymer (A) is in a range from 135° C. to below 148° C., more preferably in the range from 140° C. to 145° C.

Furthermore the heterophasic polypropylene copolymer has at least a first glass transition temperature Tg(1) and a second glass transition temperature Tg(2), wherein said first glass transition temperature Tg(1) is above the second glass transition temperature Tg(2). The glass transition temperature Tg is determined by dynamic mechanical analysis (DMTA) according to ISO 6721-7.

Accordingly it is especially preferred that the heterophasic polypropylene copolymer has a first glass transition temperature Tg(1) in the range of −10° C. to +4° C., preferably in the range of −8° C. to +2° C., more preferably in the range of −6° C. to 0° C. and/or a second glass transition temperature Tg(2) in the range of −65° C. to −45° C., preferably in the range of −62° C. to +50° C., more preferably in the range of −60° C. to −52° C.

The multiphase structure of the heterophasic polypropylene copolymer (predominantly amorphous ethylene copolymer dispersed in the matrix) can be identified by the presence of at least two distinct glass transition temperatures. The higher first glass transition temperature (Tg(1)) represents the matrix, i.e. the crystalline polypropylene homo- or copolymer, whereas the lower second glass transition temperature (Tg(2)) reflects the predominantly amorphous ethylene copolymer of the heterophasic polypropylene copolymer.

A further requirement of the heterophasic polypropylene copolymer is that it is free of phthalic acid esters or their respective decomposition products originating from a Ziegler-Nata catalyst. Thus the heterophasic polypropylene copolymer needs to be produced with a Ziegler-Nata catalyst containing an internal donor (D) not belonging to the class of phthalic acid ester derivatives. Suitable catalysts will be described below.

The heterophasic propylene copolymer of the present invention is composed of components (a-1) and (a-2) and optional components (a-3) and/or (a-4).

Component (a-1) is present in an amount of from 70.0 to 85.0 wt %, preferably from 70.0 to 82.0 wt % and more preferably from 75.0 to 82.0 wt %

Component (a-2) is present in an amount of from 15.0 to 30.0 wt %, preferably from 18.0 to 30.0 wt % and more preferably from 18.0 to 25.0 wt %.

Component (a-3) is present in an amount of from 0 to 5.0 wt %, preferably from 0.0 to 4.0 wt % and more preferably from 0.0 to 3.0 wt %.

Component (a-4) is present in an amount of from 0.0 to 0.1 wt %, preferably from 0.0 to 0.05 wt % and more preferably from 0.0 to 0.01 wt %.

If component (a-4) is added in the form of a masterbatch (MB), the amount of masterbatch containing component (a-4) is up to 10 wt % related to the entire heterophasic propylene copolymer, preferably up to 5 wt % and more preferably in the range of 1.5 to 3.5 wt % based on the entire heterophasic propylene copolymer.

The sum of fractions (a-1), (a-2), (a-3) and (a-4) is 100 wt % or lower depending on the presence of further fractions or additives. The ranges in percent by weight (wt %) as used herein define the amount of each of the fractions or components based on the entire heterophasic propylene copolymer according to the present invention. All fractions and components together give a sum of 100 wt %.

The heterophasic propylene copolymer according to the present invention apart from the polymeric components and the nucleating agent (a-4), optionally in the form of a masterbatch (MB), may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers.

Depending on the type of additive, these may be added in an amount of 0.001 to 2.0 wt %, based on the weight of the heterophasic propylene copolymer.

Preparation of the Heterophasic Propylene Copolymer

The heterophasic propylene copolymer in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes. The heterophasic propylene copolymer according to the invention is preferably prepared by a sequential polymerization process, as described below, in the presence of a catalyst system comprising a Ziegler-Natta Catalyst (ZN—C), a cocatalyst (Co) and optionally an external donor (ED), as described below.

The term "sequential polymerization system" according to this invention indicates that the heterophasic propylene copolymer is produced in at least two polymerization reactors connected in series. Accordingly, the present polymerization system comprises at least a first polymerization reactor (R1), a second polymerization reactor (R2), optionally a third polymerization reactor (R3), and further optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the optional third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

In this first polymerization reactor (R1) the matrix propylene homo- or copolymer or part of it, i.e. a first propylene homo- or copolymer fraction, is produced.

Preferably this propylene homo- or copolymer of the first polymerization reactor (R1), more preferably the polymer slurry of the loop reactor (LR) containing the matrix (M) or part of it, i.e. a first propylene homo- or copolymer fraction, is directly fed into the second polymerization reactor (R2), i.e. into the (first) gas phase reactor (GPR1), without a flash step between the stages.

This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the propylene homo- or copolymer matrix or part of it, i.e. a first propylene homo- or copolymer fraction, is led directly to the next stage gas phase reactor.

Alternatively, the propylene homo- or copolymer of the first polymerization reactor (R1), preferably polymer slurry of the loop reactor (LR) containing the propylene homo- or copolymer matrix or part of it, may be also directed into a flash step or through a further concentration step before fed into the second polymerization reactor (R2), i.e. into the 1st gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and any subsequent reactor, for instance, the third (R3) or fourth polymerization reactor (R4) are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the optional third polymerization reactor (R3), and the optional fourth polymerization reactor (R4) are gas phase reactors (GPRs).

Accordingly for the instant process at least two, preferably two polymerization reactors (R1), and (R2) or three polymerization reactors (R1), (R2) and (R3), or even four polymerization reactors (R1), (R2), R(3) and (R4), namely a slurry reactor (SR), like loop reactor (LR) and a (first) gas phase reactor (GPR1), an optional second gas phase reactor (GPR2), and optionally a third gas phase reactor (GPR3) connected in series are used.

Prior to the slurry reactor (SR) a pre-polymerization reactor is placed.

As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the optional third reactor (R3) and the optional the fourth reactor (R4) is in the range of 75 to 95° C., more preferably in the range of 78 to 92° C.

Preferably the operating temperature in the second polymerization reactor (R2) is equal to or higher than the operating temperature in the first polymerization reactor (R1). Accordingly it is preferred that the operating temperature (a) in the first polymerization reactor (R1) is in the range of 62 to 85° C., more preferably in the range of 65 to 82° C., still more preferably in the range of 67 to 80° C., like 70 to 80° C.; and (b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume (VR) to the volumetric outflow rate from the reactor (Qo) (i.e. VR/Qo), i.e τ=VR/Qo [tau=VR/Qo]. In case of a loop reactor the reaction volume (VR) equals to the reactor volume.

Accordingly the average residence time (τ) in the first polymerization reactor (R1) is preferably at least 5 min, more preferably in the range of 15 to 80 min, still more preferably in the range of 20 to 60 min, like in the range of 24 to 50 min, and/or the average residence time (τ) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time (τ) in the third polymerization reactor (R3) or in the fourth polymerization reactor (R4)—if present—is preferably at least 30 min, more preferably in the range of 30 to 120 min, still more preferably in the range of 40 to 100 min, like in the range of 50 to 90 min.

As mentioned above the preparation of the heterophasic propylene copolymer comprises in addition to the (main) polymerization of the propylene polymer in the at least two polymerization reactors (R1, R2 and optional R3, R4) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, a mixture of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

Accordingly, the heterophasic propylene copolymer is preferably produced in a process comprising polymerizing propylene in at least two subsequent polymerization steps in the presence of a Ziegler-Natta catalyst, whereby:

a) in the first polymerization reactor (R1), i.e. in a loop reactor (LR), propylene is polymerized optionally in the presence of a comonomer, obtaining either a first propylene homo- or copolymer fraction or the propylene homo- or copolymer matrix (M), transferring said first propylene homo- or copolymer fraction or the propylene homo- or copolymer matrix (M) to a second polymerization reactor (R2), b) in the second polymerization reactor (R2)

either a second propylene homo- or copolymer fraction, forming together with the first propylene homo- or copolymer fraction the propylene homo- or copolymer matrix (M), or the predominantly amorphous ethylene copolymer fraction (a2) in the presence of the propylene homo- or copolymer matrix (M) produced in earlier step a) is produced, whereupon c) if in the first and the second polymerization reactor the propylene homo- or copolymer matrix (M) is produced, in a third polymerization reactor (R3) the predominantly amorphous ethylene copolymer fraction (a2) in the presence of the propylene homo- or copolymer matrix (M) produced in earlier steps a) and b) is produced.

In another preferred process also a prepolymerization step is included prior to the reaction in the first polymerization reactor (R1).

In such a pre-polymerization step prior to the reaction in the first polymerization reactor (R1), a mixture of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). Subsequent to the pre-polymerization, the mixture of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final heterophasic propylene copolymer is rather low and typically not more than 5.0 wt %, more preferably not more than 4.0 wt %, still more preferably in the range of 0.5 to 4.0 wt %, like in the range 1.0 of to 3.0 wt %

A preferred multistage process is a "loop-gas phase"-process, as developed by *Borealis* (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene composition is obtained by a multistage polymerization process, as described above, in the presence of a catalyst system.

A suitable catalyst for the present invention is a solid Ziegler-Natta catalyst, which comprises compounds of a transition metal of Group 4 to 6 of IUPAC, like titanium, a Group 2 metal compound, like a magnesium, and an internal donor being a non-phthalic compound, more preferably a non-phthalic acid ester, still more preferably being a diester of non-phthalic dicarboxylic acids as described in more detail below. Thus, the catalyst is fully free of undesired phthalic compounds.

Further, in a further embodiment, the solid catalyst is free of any external support material, like silica or MgCl2, but the catalyst is self-supported.

The Ziegler-Natta catalyst (ZN-C) can be further defined by the way as obtained.

Accordingly, the Ziegler-Natta catalyst (ZN-C) is preferably obtained by a process comprising the steps of
a)
- a$_1$) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or
- a$_2$) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or
- a$_3$) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or
- a$_4$) providing a solution of Group 2 alkoxide of formula M(OR$_1$)$_n$(OR$_2$)$_m$X$_{2-n-m}$ or mixture of Group 2 alkoxides M(OR$_1$)$_n$X$_{2-n}$ and M(OR$_2$)$_m$X$_{2-m}$, where M is Group 2 metal, X is halogen, R$_1$ and R$_2$ are different alkyl groups of C$_2$ to C$_{16}$ carbon atoms, and $0 \le n<2$, $0 \le m<2$ and $n+m+(2-n-m)=2$, provided that both n and m #0, $0<n' \le 2$ and $0<m' \le 2$; and
b) adding said solution from step a) to at least one compound of a transition metal of Group 4 to 6 and
c) obtaining the solid catalyst component particles, and adding a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion—solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of a2) or a$_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are 02 to 04 glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched C$_6$-C$_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different C$_1$-C$_{20}$ alkyl, preferably C$_2$-C$_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)$_m$ to obtain said magnesium alkoxide compounds. Preferred polyhydric alcohols, if used, are alcohols, wherein R" is a straight-chain, cyclic or branched C$_2$ to C$_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP 261027 and EP2610272.

The Ziegler-Natta catalyst (ZN-C) is preferably used in association with an alkyl aluminum cocatalyst (Co) and optionally external donors (ED).

As further component in the instant polymerization process an external donor (ED) is preferably present. Suitable external donors include certain silanes, ethers, esters, amines, ketones, heterocyclic compounds and blends of these. It is especially preferred to use a silane. It is most preferred to use silanes of the general formula $$Ra_p Rb_q Si(ORc)_{(4-p-q)}$$

wherein Ra, Rb and Rc denote a hydrocarbon radical, in particular an alkyl or cycloalkyl group, and wherein p and q are numbers ranging from 0 to 3 with their sum p+q being equal to or less than 3. Ra, Rb and Rc can be chosen independently from one another and can be the same or different. Specific examples of such silanes are (tert-butyl)2Si(OCH3)2, (cyclohexyl)(methyl)Si(OCH3)2, (phenyl)2Si(OCH3)2 and (cyclopentyl)2Si(OCH3)2, or of general formula $$Si(OCH2CH3)3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED), a co-catalyst (Co) can be used. The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene copolymer according to this invention is preferably produced in the presence of
(a) a Ziegler-Natta catalyst (ZN-C) comprising an internal donor (ID),
(b) optionally a co-catalyst (Co), and
(c) optionally an external donor (ED).

As mentioned above the Ziegler-Natta catalyst (ZN-C) is optionally modified by the so called BNT-technology during the above described pre-polymerization step in order to introduce the polymeric nucleating agent.

Such a polymeric nucleating agent is as described above a vinyl polymer, such as a vinyl polymer derived from monomers of the formula

as described above.

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably 0.1 to 2.0, and in particular 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 60° C., preferably 15 to 55° C. General conditions for the modification of the catalyst are also disclosed in WO 00/6831, with respect to the modification of the polymerization catalyst.

The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

Component (B) Styrene-Based Elastomer

The additional required component in the present invention is a styrene-based elastomer.

It has been discovered that not any styrene-based elastomer is suitable for the present invention but only a specific class of such elastomers. Accordingly for the present invention a styrene-based elastomer being a saturated block copolymer of styrene with ethylene and butylene or propylene having a styrene content in the range of 5.0 to 22.0 wt % measured by Fourier transform infrared spectroscopy (FTIR).

Accordingly it is appreciated that the styrene-based elastomer (B) has a styrene content of 5.0 wt % to 22.0 wt %, preferably 5.0 wt % to 15.0 wt %, more preferably of 7.0 wt % to 15.0 wt % and even more preferably of 10.0 wt % to 14.0 wt %.

Further it is appreciated that the styrene-based elastomer (B) has a melt flow rate MFR$_2$ (230° C., ISO 1133) of not more than 20.0 g/10 min, more preferably not more than 10.0 g/10 min and still more preferably not more than 6.0 g/10 min. On the other hand the melt flow rate of the styrene based elastomer(s) (B), preferably the styrene-ethylene/butylene-styrene (SEBS) block copolymer shall not fall below 1.0 g/10 min. Accordingly, a preferred range is from 1.0 to 20.0 g/10 min, more preferred of 2.0 to 10.0 g/10 min, even more preferably 2.0 to 6.0 g/10 min, like 2.0 to 5.0 g/10 min.

Further the styrene-based elastomer (B) may be defined by its density.

Thus it is appreciated that the styrene-based elastomer (B) has a density of equal or below 0.905 g/cm$^3$, more preferred in the range of 0.850 to 0.905 g/cm$^3$.

Additionally or alternatively the styrene-based elastomer (B) can be defined by the Shore A hardness. Thus it is appreciated that has a Shore A hardness measured according to ASTM D 2240 from 25 to 70, preferably from 30 to 60, more preferably from 30 to 50.

Specific commercialised examples of styrene-based elastomer (B) are KRATON G1645, KRATON G1642 or KRATON G1643.

The styrene-based elastomer (B) is present in the inventive composition in an amount from 1.0 to 50.0 wt %, preferably 5.0 to 50.0 wt % and more preferably from 9.0 to 50.0 wt %.

Ad) Soft Heterophasic Propylene Copolymer Composition

The composition of the present invention comprises component (A) and component (B) as described above.

The heterophasic propylene copolymer (A) is present in the inventive composition in an amount from 50.0 to 99.0 wt %, preferably 50.0 to 95.0 wt % and more preferably from 50.0 to 91.0 wt %.

The styrene-based elastomer (B) is present in the inventive composition in an amount from 1.0 to 50.0 wt %, preferably 5.0 to 50.0 wt % and more preferably from 9.0 to 50.0 wt %.

Further it is appreciated that the component (A) and the styrene based elastomer(s) (B) are the only polymer components in the polymer composition.

Accordingly it is in particular preferred that the heterophasic propylene copolymer composition according to this invention comprises as the only polymer components within the composition component (A) and the styrene based elastomer(s) (B).

In other words the heterophasic propylene copolymer composition may comprise additives but no further polymers other than component (A) and the styrene based elastomer(s) (B).

Typical additives are those mentioned above in the section component (A). The total amount of additives shall be not more than 10.0 wt %, preferably not more than 8.0 wt %, more preferably not more than 5.0 wt %, yet more preferably not more than 4.0 wt %, still more preferably not more than 3.0 wt %, in the total heterophasic propylene copolymer composition.

The heterophasic propylene copolymer composition according to the present invention is especially featured by its specific mechanical and optical properties.

Thus the soft heterophasic propylene copolymer composition is characterized by a rather low composition melt flow rate ($MFR_C$) (ISO 1133; 230° C.; 2.16 kg) in the range of 0.5 to 15.0 g/10 min, preferably in the range of 1.0 to 10.0 g/10 min, more preferably in the range of 1.5 to 8.0 g/10 min and even more preferably in the range of 2.0 to 6.0 g/10 min.

The soft heterophasic propylene copolymer composition of the instant invention has preferably a tensile modulus measured according to ISO 527-1,2 (cross head speed=1 mm/min), measured on a 50 µm cast film) of below 320 MPa, preferably below 300 MPa and more preferably below 280 MPa.

In one embodiment of the present invention, the heterophasic propylene copolymer has a flexural modulus measured according to ISO 178 on injection molded specimen below 450 MPa. For example, the heterophasic propylene copolymer composition has a flexural modulus measured according to ISO 178 in the range of 50 to 450 MPa, preferably in the range of 60 to 400 MPa.

With regard to the optical properties it is preferred that the heterophasic propylene copolymer composition has a haze according to ASTM D 1003-00 measured on a 1 mm thick injection molded specimen from 5.0 to below 50.0%, preferably from 5.0 to below 40.0%, more preferably from 5.0 to 38.0%.

Additionally or alternatively, the heterophasic propylene copolymer composition has a haze before steam sterilization determined according to ASTM D 1003-00 measured on a 50 µm cast film of below 5.0%, preferably of below 3.0%, and/or a haze after steam sterilization determined according to ASTM D 1003-00 measured on a 50 µm cast film of below 10.0 preferably of below 5.0%.

Steam sterilization of the film usually carried out in a temperature range of 120 to 130° C.

Thus in one embodiment of the present invention, the heterophasic propylene copolymer composition has
i) a haze according to ASTM D 1003-00 measured on a 1 mm thick injection molded specimen from 5.0 to below 50.0%, preferably from 5.0 to below 40.0 and/or
ii) a haze before steam sterilization determined according to ASTM D 1003-00 measured on a 50 µm cast film of below 5.0%, preferably of below 3.0%, and/or
iii) a haze after steam sterilization determined according to ASTM D 1003-00 measured on a 50 µm cast film of below 10.0% preferably of below 5.0%.

Additionally or alternatively to the previous paragraphs, the difference between the haze after steam sterilization and the haze before steam sterilization measured according to ASTM D 1300-00 on a 50 µm thick film is below 4.0%, more preferably below 3.0%, still more preferably below 2.5%. Said difference can also reach negative values.

Preparation of the Soft Heterophasic Propylene Copolymer Composition

The heterophasic propylene copolymer composition is prepared by simply mixing in an extruder component (A), the heterophasic polypropylene copolymer, with component (B), the styrene based elastomer and extruding the mixture.

More precisely the heterophasic propylene copolymer composition may be prepared by compounding the components within suitable melt mixing devices for preparing polymeric compounds, including in particular extruders single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C.

In a further embodiment the present invention is related to a process for producing the composition comprising the steps of
(i) preparing the matrix (M),
(ii) preparing the elastomeric propylene copolymer (E) and dispersing the elastomeric copolymer (E) in the matrix (M) to obtain the heterophasic propylene copolymer (A), whereby the heterophasic propylene copolymer is prepared in the presence of
  a) a Ziegler-Natta catalyst (ZN-C) comprising compounds (TC) of a transition metal of Group 4 to 6 of IUPAC, a Group 2 metal compound (MC) and an internal donor (ID), said internal donor (ID) is a non-phthalic compound,
  b) a co-catalyst (Co), and
  c) optionally an external donor (ED),
and subsequently
(iii) mixing said heterophasic propylene copolymer (A) with the styrene-based elastomer (B) and
iv) extruding said mixture.

Use

The invention is also directed to the use of the inventive heterophasic propylene copolymer composition.

Accordingly the present invention is directed to the use of the heterophasic propylene copolymer composition as defined in the instant invention for the preparation of films, in particular sterilisable or sterilised films. The films can be blown films or cast films.

They may be unoriented or oriented in machine direction. Preferably the films are unoriented.

Further the present invention is directed to a film, in particular to a sterilisable or sterilised film, comprising the heterophasic propylene copolymer composition as defined in the instant invention.

More preferably the heterophasic propylene copolymer composition is the only polymer component in the film.

Further the present invention is directed to containers, i.e. pouches, especially to a sterilisable or sterilised container, i.e. pouch, comprising the film as defined in herein. The container is in particular a pouch. Further said container, i.e. pouch, or the film has been preferably subjected to a sterilisation treatment.

The invention will now be illustrated by reference to the following non-limiting examples Methods The Xylene Soluble Fraction at Room Temperature (XCS, wt %):

The amount of the polymer soluble in xylene is determined at 25° C. according to ISO 16152; 5th edition; 2005 Jul. 1.

Intrinsic Viscosity (IV)

The intrinsic viscosity (IV) value increases with the molecular weight of a polymer. The IV values e.g. of the XCS were measured according to ISO 1628/1 in decalin at 135° C.

The glass transition temperature Tg is determined by dynamic mechanical thermal analysis according to ISO 6721-7. The measurements are done in torsion mode on compression moulded samples (40×10×1 mm3) between −100° C. and +150° C. with a heating rate of 2° C./min and a frequency of 1 Hz.

MFR2 (230° C.) is measured according to ISO 1133 (230° C., 2.16 kg load)

The melt flow rate is measured as the MFR2 in accordance with ISO 1133 15 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

The $MFR_2$ of a fraction (B) produced in the presence of a fraction (A) is calculated using the measured values of MFR2 of fraction (A) and the mixture received after producing fraction (B) ("final"):

$$Log(MFR_{final}) = \text{weight fraction}(A) * Log(MFR_A) + \text{weight fraction}(B) * Log(MFR_B)$$

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}] = 100 * fE$$

The weight percent comonomer incorporation was calculated from the mole fraction:

$$E[\text{wt \%}] = 100 * (fE * 28.06) / ((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Melting Temperature

Melting temperature ($T_m$) was measured with a Mettler TA820 differential scanning calorimetry (DSC) apparatus on 5 to 10 mg samples. DSC was performed according to ISO 3146 (part 3, method C2) in a heat/cool/heat 15 cycle with a scan rate of 10° C./min in the temperature range of +23 to +210° C. Melting temperature was determined from the second heating step.

Styrene Content

The styrene content is measured by Fourier transform infrared spectroscopy (FTIR). A thin film of 300 mm thickness is prepared from pelletized material by hot-pressing (190° C., 100 bar, 1 minute). Per sample, two films are prepared. The so prepared film-samples are measured by a Perkin Elmer IR-Spectrophotometer System 2000FTIR.

The peak at 1602 cm-1 (Phenyl-Absorption) is integrated and evaluated by using an internally established calibration curve. The arithmetic mean of two measurements is given as result.

Calibration: Various polypropylene-compounds consisting of PP and a styrene-containing elastomer (of known styrene-content) are prepared and measured according to the method described above.

Shore A hardness is measured according to ASTM D 2240

Tensile modulus in machine direction was determined according to ISO 527-1,2 at 23° C. on 50 μm cast film produced on a monolayer cast film line with a melt temperature of 220° C. and a chill roll temperature of 20° C. Testing was performed at a cross head speed of 1 mm/min.

Flexural Modulus:

The flexural modulus was determined in 3-point-bending according to ISO 178 on 80×10×4 $mm^3$ test bars injection molded at 23° C. in line with EN ISO 1873-2.

Haze were determined according to ASTM D1003-00 on 60×60×1 $mm^3$ plaques injection molded in line with EN ISO 1873-2 using a melt temperature of 200° C. and on cast films of 50 μm thickness produced on a monolayer cast film line with a melt temperature of 220° C. and a chill roll temperature of 20° C.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

EXAMPLES

Preparation of the Catalyst

The catalyst used in the polymerization processes for the heterophasic propylene copolymers of the inventive examples (IE) was prepared as follows:

Used chemicals:

20% solution in toluene of butyl ethyl magnesium (Mg(Bu)(Et), BEM), provided by Chemtura 2-ethylhexanol, provided by Amphochem 3-Butoxy-2-propanol-(DOWANOL™ PnB), provided by Dow bis(2-ethylhexyl)citraconate, provided by SynphaBase TiCl4, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl4 and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and dicyclopentyl dimethoxy silane (D-Donor) as donor for preparing the heterophasic polypropylene copolymer (A) used according to the present invention. Polymerization was done in Borstar plant with a pre-polymerization step, one loop reactor and 2 gas-phase reactors. The conditions can be seen in Table 1. The matrix was a random propylene copolymer, thus a RAHECO was produced.

TABLE 1

Preparation of heterophasic polypropylene copolymer (A) with random copolymer as matrix, i.e. RAHECO

|  |  | RAHECO |
|---|---|---|
| Prepolymerization |  |  |
| TEAL/Ti | [mol/mol] | 220 |
| TEAL/donor | [mol/mol] | 6.1 |
| Temperature | [° C.] | 31 |
| Loop |  |  |
| Temperature | [° C.] | 70 |
| Split | [%] | 33 |
| H2/C3 ratio | [mol/kmol] | 0.5 |
| C2/C3 ratio | [mol/kmol] | 5.7 |
| MFR2 | [g/10 min] | 4.0 |
| XCS | [wt %] | 9.8 |
| C2 content | [wt %] | 3.0 |
| GPR 1 |  |  |
| Temperature | [° C.] | 80 |
| Pressure | [kPa] | 2500 |
| Split | [%] | 54 |
| H2/C3 ratio | [mol/kmol] | 7.8 |
| C2/C3 ratio | [mol/kmol] | 26.3 |
| MFR2 | [g/10 min] | 6.3 |
| XCS | [wt %] | 8.1 |
| C2 content | [wt %] | 4.1 |
| GPR 2 |  |  |
| Temperature | [° C.] | 75 |
| Split | [%] | 13 |
| C2/C3 ratio | [mol/kmol] | 555 |
| H2/C2 ratio | [mol/kmol] | 502 |
| MFR2 | [g/10 min] | 4.9 |

TABLE 1-continued

Preparation of heterophasic polypropylene copolymer
(A) with random copolymer as matrix, i.e. RAHECO

| | | RAHECO |
|---|---|---|
| XCS | [wt %] | 20.5 |
| IV (XCS) | [dl/g] | 1.5 |
| C2 (XCS) | [wt %] | 33.4 |
| C2 content | [wt %] | 9.2 |
| Tm | [° C.] | 142.2 |
| Tg1 | [° C.] | −4 |
| Tg2 | [° C.} | −56 |

C2 ethylene
H2/C3 ratio hydrogen/propylene ratio
C2/C3 ratio ethylene/propylene ratio
H2/C2 ratio hydrogen/ethylene ratio
GPR 1/2 $1^{st}/2^{nd}$ gas phase reactor
Loop Loop reactor The heterophasic propylene copolymer RAHECO was mixed in a co-rotating twin-screw extruder Coperion ZSK 57 at 220° C. with 0.2 wt % of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.1 wt % calcium stearate In a next step the RAHECO (A) was mixed with styrene-based elastomer (B).

The styrene-based elastomer (B) was KRATON G1645 M provided by Kraton Polymers LLC.

This styrene-based elastomer (B) has a styrene content measured according to FTIR of 12.5 wt %, a MFR$_2$ of 3.0 g/10 min, Shore A of 35 and a density of 0.900 g/cm$^3$.

Mixing was done in a co-rotating twin-screw extruder Coperion ZSK 57.

As Comparative Example 1 (CE1) the unblended RAHECO as prepared above was used.

Comparative Example 2 (CE2) is PP2 from EP2831169 (used in CE1 of EP 2831169).

Comparative Example 3 (CE3) is the blend of PP2+25 wt % SEBS-1 from EP2831169 (indicated as CE2 in EP 2831169).

Comparative Example 4 (CE4) is RAHECO 3 from EP2831169 (indicated as CE8 in EP 2831169).

Comparative Example 5 (CE5) is the blend of RAHECO 3+15 wt % SEBS-1 from EP2831169 (indicated as IE3 in EP 2831169).

Comparative Example 6 (CE6) is the blend of RAHECO 3+25 wt % SEBS-1 from EP2831169 (indicated as IE4 in EP 2831169).

Comparative Examples CE2 to CE6, taken from EP2831169 were all produced with a Ziegler-Natta catalyst containing a phthalate based internal donor.

SEBS-1 of EP2831169 is the same as KRATON G1645 M used according to the present invention.

The properties of IE1 to IE4, as well as of CE1 to CE6 are shown in Table 2:

TABLE 2

| property | unit | IE1 | IE2 | IE3 | IE4 | CE1 | CE2 | CE3 | CE4 | CE5 | CE6 |
|---|---|---|---|---|---|---|---|---|---|---|---|
| RAHECO* | Wt % | 90 | 75 | 60 | 50 | 100 | | | | | |
| PP2 | Wt % | | | | | | 100 | 75 | | | |
| RAHECO 3 | Wt % | | | | | | | | 100 | 85 | 75 |
| KRATON G1645 M | Wt % | 10 | 25 | 40 | 50 | 0 | 0 | 25 | 0 | 15 | 25 |
| MFR$_2$ | g/10 min | 4.6 | 4.7 | 4.9 | 4.9 | 4.9 | 3.8 | 4.5 | 3.1 | 4.6 | 4.0 |
| XCS(c) | Wt % | 27 | 39 | 51 | 60 | 20.5 | 23 | 40 | 48 | 56 | 61 |
| Flexural Modulus | MPa | 386 | 190 | 83 | 65 | 561 | 555 | 189 | 254 | 135 | 85 |
| Haze IM b.s 50 μm film | % | 31.5 | 21.3 | 14.5 | 12 | 47 | 47 | 41 | 30 | 19 | 14 |
| Tensile Modulus MD b.s. | MPa | 262 | 101 | 60 | 35 | 322 | 337 | 119 | 198 | 82 | 52 |
| Haze/b.s. | % | 1 | 1 | 1 | 1 | 1 | 4.6 | 3 | 13 | 11 | 5 |
| Haze/a.s. | % | 3 | 3 | 3 | 3 | 3.9 | 12 | 10 | 25 | 35 | 30 |
| Delta haze | % | 2 | 2 | 2 | 2 | 2 | 7.4 | 7 | 12 | 14 | 25 |

RAHECO . . . heterophasic polypropylene copolymer A used according to the invention
PP2 and RAHECO 3, as described in EP2831169
XCS(c) is the xylene cold soluble content of the composition
Haze IM haze measured on injection moulded plaques
b.s. before steam sterilization
a.s. after steam sterilization

The invention claimed is:
1. Soft heterophasic propylene copolymer composition, which comprises:
(A) 50.0 to 99.0 wt % of a heterophasic polypropylene copolymer, said heterophasic propylene copolymer comprises:
(a-1) a matrix (M) being a crystalline polypropylene homo- or copolymer and
(a-2) elastomeric propylene copolymer (E) dispersed in said matrix (M),
wherein the heterophasic polypropylene copolymer has;
(i) a melt flow rate (MFR 230° C./2.16 kg, ISO1133) of 0.5 to 20.0 g/10 min,
(ii) a xylene cold soluble (XCS) content determined according to ISO 16152 (25° C.) in the range of 15.0 to 30.0 wt %,

(iii) a total ethylene or $C_4$-$C_8$ comonomer content in the range of 5.0 to 13.0 wt %,
(iv) wherein the heterophasic polypropylene copolymer is free of phthalic acid esters or their decomposition products originating from a Ziegler-Nata catalyst, and
(B) 1.0 to 50.0 wt % of a styrene-based elastomer (B) being a saturated block copolymer of styrene with ethylene and butylene or propylene, having a styrene content in the range of 5.0 to 22.0 wt % (measured with FTIR),
the soft heterophasic propylene copolymer composition having a flexural modulus measured according to ISO 178 on injection moulded specimens of below 450 MPa.

2. The soft heterophasic propylene copolymer composition according to claim 1, wherein the xylene cold soluble (XCS) content (ii) of the heterophasic polypropylene copolymer has:
(ii-1) a comonomer content in the range of 15.0 to 40.0 wt % and
(ii-2) an intrinsic viscosity (iV) determined according to DIN ISO 1628/1 (in decalin at 135° C.) in the range of 1.0 to 2.0 dl/g.

3. The soft heterophasic propylene copolymer composition according to claim 1, wherein the matrix (M) of the heterophasic polypropylene copolymer is a random propylene-copolymer (R-PP) wherein the random propylene copolymer (R-PP) has:
a melt flow rate $MFR_2$ (230° C.) measured according to ISO 1133 in the range of 0.5 to 20.0 g/10 min, and
a comonomer content in the range of 1.0 to 12.0 wt %.

4. The soft heterophasic propylene copolymer composition according to claim 1, wherein the comonomer of the random propylene copolymer (R-PP) and the comonomer of the elastomeric propylene copolymer (E) are ethylene.

5. The soft heterophasic propylene copolymer composition according to claim 1, wherein the styrene based elastomer (B) has a:
melt flow rate $MFR_2$ (230° C., ISO 1133) in the range of 1.0 to 20.0 g/10 min and
a density of below 0.905 g/m$^3$ or
a Shore A hardness measured according to ASTM D 2240 in the range of 25 to 70.

6. The soft heterophasic propylene copolymer composition according to claim 1, wherein the heterophasic propylene copolymer has a tensile modulus according to ISO 527-1,2 measured on a 50 μm cast film of below 320 MPa.

7. The soft heterophasic propylene copolymer composition according to claim 1, wherein the heterophasic propylene copolymer has
i) a haze before steam sterilization according to ASTM D 1003-00 measured on a 1 mm thick injection molded specimen from 5.0 to below 50.0%, and/or
ii) a haze before steam sterilization determined according to ASTM D 1003-00 measured on a 50 μm cast film of below 5.0%, and/or
iii) a haze after steam sterilization determined according to ASTM D 1003-00 measured on a 50 μm cast film of below 10.0%.

8. Process for producing a soft heterophasic propylene copolymer composition according to claim 1, which process comprises the steps of:
(i) preparing a matrix (M),
(ii) preparing the elastomeric propylene copolymer (E) and dispersing the elastomeric copolymer (E) in the matrix (M) to obtain a heterophasic propylene copolymer (A), whereby the heterophasic propylene copolymer is prepared in the presence of:
a) a Ziegler-Natta catalyst (ZN-C) comprising compounds (TC) of a transition metal of Group 4 to 6 of IUPAC, a Group 2 metal compound (MC) and an internal donor (ID), said internal donor (ID) is a non-phthalic compound,
b) a co-catalyst (Co), and
c) optionally an external donor (ED),
and subsequently
(iii) mixing said heterophasic propylene copolymer (A) with a saturated block copolymer of styrene with ethylene and either butylene or propylene, having a styrene content in the range of 5.0 to 22.0 wt % (measured with FTIR) (B), and
iv) extruding said mixture.

9. The process according to claim 8, wherein:
a) the internal donor (ID) is selected from optionally substituted malonates, maleates, succinates, glutarates, cyclohexene-1,2-dicarboxylates, benzoates and derivatives and/or mixtures thereof;
b) the molar-ratio of co-catalyst (Co) to external donor (ED) [Co/ED] is 5 to 45.

10. The process according to claim 8, wherein the heterophasic propylene copolymer comprising a matrix (M) being a random propylene copolymer (R-PP) and an elastomeric propylene copolymer (E) dispersed in said matrix (M) is produced in a multistage process comprising at least two reactors connected in series.

11. The process according to claim 10, wherein:
(a) in a first reactor propylene and ethylene and/or $C_4$ to $C_8$ α-olefin are polymerized obtaining a first propylene copolymer fraction (R-PP1),
(b) transferring said first propylene copolymer fraction (R-PP1) to a second reactor,
(c) polymerizing in said second reactor in the presence of the first propylene copolymer fraction (R-PP1) propylene and ethylene and/or $C_4$ to $C_8$ α-olefin obtaining a second propylene copolymer fraction (R-PP2), said first propylene copolymer fraction (R-PP1) and said second propylene copolymer fraction (R-PP2) form the matrix (R-PP),
(d) transferring said matrix (M) to a third reactor,
(e) polymerizing in said third reactor in the presence of the matrix (M) propylene and ethylene and/or $C_4$ to $C_8$ α-olefin obtaining an elastomeric propylene copolymer (E), said matrix (M) and said elastomeric propylene copolymer (E) form the heterophasic propylene copolymer.

12. A film, comprising the heterophasic propylene copolymer composition as defined in claim 1, the film being either a cast or a blown film and can be unoriented or oriented.

13. The film according to claim 12, being subjected to a steam sterilisation treatment.

* * * * *